Patented Aug. 17, 1954

2,686,729

UNITED STATES PATENT OFFICE 2,686,729

MOLDING SAND COMPOSITIONS

Davitt W. Barry, Saginaw, Mich., assignor to Minco Products Corporation, Saginaw, Mich., a corporation of Michigan No Drawing. Application January 5, 1952,
Serial No. 265,214

6 Claims. (Cl. 106—38.9)

The present invention relates to molding sand compositions and is more particularly concerned with synthetic molding sands containing a substantially neutral glaciolacustrine clay as a stabilizer.

Heretofore, foundry molding compositions of the synthetic type have been prepared by adding to the silica sand a variety of bonding clays, binders, and organic materials which function as stabilizers, such as wood flour, sea coal, or cereal additives. Such synthetic molding preparations are then employed in the formation of suitable molds into which liquid metals are poured in order to form castings. Among the bonding agents and binders employed are the fire-clays, consisting chiefly of kaolinite, montmorillonite mineral clays such as the western and southern bentonites, and certain refractory clays, all of which materials contribute characteristic properties to the synthetic sands utilized in the preparation of the finished casting molds. The organic materials serve to stabilize the completed mold, especially when the mold is subjected to elevated temperatures during the casting operation and to obviate cracks and other defects which frequently occur as a result of mold expansion and contraction.

Therefore, it is an object of the present invention to provide a novel molding composition containing sand, a bonding or binding agent, and a stabilizer of substantially neutral glacio-lacustrine clay. It is a further object of the present invention to provide a foundry molding composition having high dry compression strength, high flowability, and high collapsibility. Another object of the present invention is to provide a molding sand composition wherein a substantially neutral glacio-lacustrine clay is employed to stabilize and enhance the physical properties of the conventional bonding or binding agent. Still another object of the present invention is to provide a synthetic molding composition having an inorganic stabilizer and containing only a very minor amount of conventional organic material. Other objects of the present invention will be apparent to those skilled in the art to which this invention pertains.

The novel composition of the present invention is a foundry molding sand composition having high dry compression strength, high flowability and high collapsibility, which comprises sand, a bonding agent and a glacio-lacustrine clay as a stabilizer. The glacio-lacustrine clay from the Saginaw Basin area of Michigan is the preferred stabilizer embodiment.

The glacio-lacustrine clay utilized in the composition of the present invention is of unusual and unique geological origin. It was deposited in a relatively deep glacial lake that occupied the Saginaw Basin area of Michigan during the retreatal stages of the Pleistocene or last glacial epoch about 20 or 25 thousand years ago. The term, "Saginaw Basin area of Michigan," has been applied geologically to that general area of central Michigan which includes, for example, the present city and county of Saginaw and other nearby cities and counties. The term, "glacio-lacustrine clay," denotes this rare, glacial deposit which settled out very slowly and without the aggregation or flocculation of particles which customarily takes place in saline waters. The geological analysis is quite unlike the fire-clay and other clay-like materials and is also very different from that reported for the bentonites, montmorillonites, and other diatomaceous materials.

Analysis indicates the material to be, when calculated on the basis of the oxide form, of the following approximate composition:

| | |
|---|---|
| $SiO_2$ ----------percent-- | 41.44 |
| $Al_2O_3$ ----------do---- | 12.6 |
| $CaO$ ----------do---- | 14.2 |
| $MgO$ ----------do---- | 6.06 |
| $Fe_2O_3$ ----------do---- | 5.3 |
| $MnO$ ----------do---- | 0.045 |
| Specific gravity | 2.65 |
| Ignition loss | 18.09 |
| pH | 7.65 |

Determinations by the glass electrode method indicate a pH value of between 7.2 and 7.65, substantially neutral, whereas the bentonite materials are significantly on the alkaline side. Western bentonite, for example, exhibits a pH of about 9.3. The percentage of silica in the glacio-lacustrine clay, analyzed on the basis of the oxide form, is about 41 percent, whereas the western bentonite and other bentonite materials contain around 62–63 percent silica when calculated on the same basis. Even more significant are the comparative values for calcium, the glacio-lacustrine clay containing about 14.2 percent, whereas the western bentonites customarily contain about 1.5 percent and the southern bentonites about 1.0 percent, or roughly one-tenth as much calcium. Foundry practice has generally dictated that materials utilized in synthetic molding sands should be of very low calcium or lime content, since the presence of these latter materials is deemed to be responsible for the "blow-outs" and other deleterious effects that may occur in the mold under actual casting conditions. The calcium of this clay-like material is apparently present as calcium carbonate in extremely small particle size, i. e., largely of colloidal size, thus having at least one dimension of 500-millimicrons size or smaller. In view of the high percentage of calcium exhibited, it is entirely unexpected that the glacio-lacustrine clay could be incorporated advantageously in molding sand compositions.

The organic materials, generally termed "organics" in foundry practice, are customarily added to supplement and stabilize the sand and the bonding clays, such as fire-clays, western or southern bentonite. For example, in the synthetic molding sand compositions utilized in the manufacture of large steel castings, cereal stabilizers, i. e., waste organic by-products of the cereal industry, are employed. Wood flour is conventionally used in the preparation of synthetic molding compositions employed in the formation of smaller steel castings while pulverized bituminous coal is frequently used in the production of iron castings. The use of organics tends to alleviate the "burn-in," "fusion," and "metal penetration" defects exhibited by castings poured in molds of crude silica sands. The expansion and contraction of the crude sand grains and of many of the bonding agents, notably western bentonite, at the elevated temperatures at which the castings are poured are fundamentally causes of "fusion" and "burn-in." The function of the organics in such system is to provide a "cushion" or "base" which will ignite and burn out at elevated temperatures, thereby creating interstices or voids in the sand mold which can take up or absorb the sand expansion, thus preventing buckling or cutting defects in the finished casting. The ignited organic matter is burned off as the molten metal is poured. In addition, these organics tend to increase the "flowability," i. e., that quality which permits the molding sand composition to pass through chutes and other conveying apparatus, and in some instances may aid "collapsibility" which latter property enables the molding sand to collapse upon cooling thus permitting the castings to be shaken out and readily cleaned after cooling is achieved. One or more of these organics is customarily employed in molding sand systems, although some, notably wood flour, cut down the "green" strength, i. e., the adhesive characteristic which enables the mold to remain intact prior to the pouring of the molten metal, and generally reduce the permeability of the sand mold. Too low permeability may result in the formation of pin holes and gas seams in the finished casting. The glacio-lacustrine clay stabilizer of the present invention enhances flowability and collapsibility of the sand system without sacrifice of green strength. The glacio-lacustrine clay stabilizer, being chiefly inorganic in nature, adds high compression strength qualities to the system whereas the conventional organics contribute virtually no compression strength.

The glacio-lacustrine clay material itself is not advantageously employed as the bonding agent alone in the silica sand molding composition, since its green compression strength is somewhat lower than that possessed by either the western or southern bentonite. For example, eleven percent by weight of the glacio-lacustrine clay is required with 89 percent standard silica sand to produce a molding sand composition having approximately seven pounds green compression strength, whereas only about 3.3 percent southern bentonite and about four percent western bentonite are required to achieve the same green compression strength. Thus, about two to three times the amount of glacio-lacustrine clay is required to achieve the same result as western or southern bentonite in terms of green strength. Therefore, the chief value of this glacio-lacustrine clay material is to augment and enhance the weak characteristics of the bonding clay and to reduce substantially the amount of the organics which have heretofore been used in conjunction with the bonding clays in the preparation of a satisfactory synthetic molding sand. Preferably, the glacio-lacustrine clay stabilizer of the present invention is employed with either a western or southern bentonite or a fire-clay, which combination together with the silica sand provides an excellent composition possessing virtually all the fundamental requisites of a satisfactory synthetic molding system.

In the early synthetic molding sand compositions, fire-clays, comprising largely kaolinite, were employed as the binder or bonding agent. However, such material tends to diminish the permeability of the sand mold, thereby causing the completed castings to exhibit pin-holes and other similar defects. In addition, the fire-clay bonded systems may show poor dry compression strength. The glacio-lacustrine clay used by applicant as the stabilizer in its novel molding sand composition is to be distinguished from the fire-clays both in terms of analysis and in its action in molding sand compositions. For example, a test sample containing 88 percent American Foundry Association standard sand and 12 percent fire-clay was compared with a standard sample containing a like amount of glacio-lacustrine clay and the following test data obtained:

TABLE I

| | Glacio-lacustrine clay | Fire-Clay (Ohio) |
|---|---|---|
| Moisture_____percent__ | 3.2 | 3.2 |
| Green compression strength_____pounds__ | 7.3 | 8.1 |
| Dry compression strength (cooled from 600 degrees Fahrenheit)_____p. s. i__ | 72.0 | 45.2 |

Thus, the glacio-lacustrine clay is far superior to the fire-clay in terms of the dry compression strength which it imparts to the molding sand composition.

Frequently, the western bentonites, disclosed in United States Patent 1,657,573, have been employed as binding or bonding agents in synthetic molding sands. These bentonite clays are found in the western areas of the United States and are composed chiefly of the mineral, montmorillonite, which under aqueous conditions swells considerably and becomes gummy or adhesive so that the degree of flowability of a molding sand composition containing western bentonite is seriously reduced. The western bentonite bonded sand flows very reluctantly through conveyors and chutes, and cannot be easily rammed or squeezed around a mold pattern. The swelling of the sand mold, due to the bentonite bond, and subsequent shrinkage causes the mold to spall and crack, thereby damaging the finished casting. To alleviate such swelling and shrinkage of the western bentonite bonded systems, large amounts of organics, usually both cereal additives and pulverized bituminous coal, must be employed. In addition, the synthetic sand systems containing a western bentonite bond exhibit low collapsibility, so that the interior of the sand mold does not collapse readily upon cooling. As a result of such low collapsibility the bonded sand tends to adhere or stick to the castings forming a hard, sand mass which is carried along with the casting to the cleaning room of the foundry where it is removed only with difficulty. The used sand, returned from the cleaning room, is characterised by the presence of hard lumps and cannot be easily re-conditioned for further molding sand use.

More recently, as shown by United States Patent 2,180,817, southern bentonite materials, mined primarily in the southern states of the United States have been employed widely as bonding clays in synthetic molding sand systems. Such southern bentonites are non-swelling in contrast with the western bentonites, and possess a higher green strength than the western bentonite. However, at two percent moisture content the low dry compression strengths of the southern bentonite bonded systems preclude their successful use in the casting of many articles. This low dry compression strength is a characteristic well recognized in foundry practice and attempts have been made to increase this property to improve the sand mold. For example, United States Patent 2,389,541 claims a pre-heat treatment of the non-swelling montmorillonites (southern bentonites) in order to improve the dry compression strength, and United States Patent 2,389,538 claims a boric acid treated southern bentonite composition which exhibits far superior dry compression strength as compared with the untreated non-swelling clay (southern bentonite). In addition, the molding sand composition bonded with a southern bentonite type clay exhibits low hot strength, so that at the elevated temperatures, 2500 to 2700 degrees Fahrenheit, which are required for certain heavy iron and steel castings, the southern bentonite bonded systems cannot be satisfactorily employed. As shown in United States Patent 2,256,047, ferric oxide has been used to supplement the southern bentonite in an effort to improve the hot strength quality of the thus bonded sand. As a result of the low dry and hot strength characteristics of the southern bentonite, the durability of the bonded sand system is seriously impaired so that as the sand is used and re-bonded continually in foundry practice, replacement amounts of southern bentonites are unusually high.

The following test data prepared in accord with the recommended procedures of the American Foundrymen's Association compare the western bentonite, southern bentonite and glacio-lacustrine clay sand systems, each test sample having approximately the same initial green strength:

TABLE II

| Sample | 11% Glacio-lacustrine clay; 89% Standard sand | 3.3% southern Bentonite; 96.7% Standard sand | 4% western Bentonite; 96% Standard sand |
|---|---|---|---|
| 1st Specimen: | | | |
| Moisture_____percent__ | 2.5 | 2.0 | 2.0 |
| Green Compression pounds__ | 7.3 | 7.5 | 7.0 |
| Dry Compression__do____ | 35.0 | 7.0 | 26.0 |

Baked at 600 degrees Fahrenheit. Retempered and allowed to stand for two hours.

| | | | |
|---|---|---|---|
| Moisture_____percent__ | 2.6 | 2.0 | 2.1 |
| Green Compression pounds__ | 6.2 | 3.8 | 6.1 |
| Dry Compression__do____ | 48.0 | 2.0 | 26.0 |
| Loss_____percent__ | 15.1 | 50.0 | 12.5 |
| 2nd Specimen: | | | |
| Moisture_____percent__ | 2.5 | 2.0 | 2.0 |
| Green Compression pounds__ | 7.6 | 7.5 | 6.9 |

Baked at 1800 degrees Fahrenheit for seven minutes—4″ x 4″ x 4″ cube. Retempered and settled for two hours.

| | | | |
|---|---|---|---|
| Moisture_____percent__ | 2.4 | 2.0 | 2.0 |
| Green Compression pounds__ | 4.6 | 2.2 | 4.0 |
| Loss_____percent__ | 39.5 | 70.6 | 42.0 |

TABLE III

| Sample | 2 Parts glacio-lacustrine clay; 1 Part western Bentonite | 2 Parts southern Bentonite; 1 Part western Bentonite |
|---|---|---|
| Western Bentonite, grams_____ | 70 | 42 |
| A. F. A. Sand, grams_____ | 1,790 | 1,874 |
| Glacio-lacustrine clay_____ | 140 | ---------- |
| Southern Bentonite, grams_____ | ---------- | 84 |
| Water, ml_____ | 68 | 68 |

Riddled, set two hours. Riddled again and tested.

| | | |
|---|---|---|
| Moisture, percent_____ | 3.1 | 3.2 |
| Permeability_____ | 158.3 | 178.3 |
| Green compression, p. s. i_____ | 8.3 | 9.3 |
| Green deformation, in./in_____ | .0180 | .0158 |
| Dry compression, p. s. i_____ | 280+ | [1] 280+ |

Baked twelve minutes at 1,800 degrees Fahrenheit as 4″ x 4″ x 4″ cube. Retempered. Riddled. Set two hours. Riddled and tested.

| | | |
|---|---|---|
| Moisture, percent_____ | 3.1 | 2.9 |
| Permeability_____ | 175 | 212.7 |
| Green compression, p. s. i_____ | 4.77 | 2.05 |
| Green deformation, in./in_____ | .012 | .0115 |
| Dry compression, p. s. i_____ | 30.5 | 13.5 |
| Loss, Green Compression, percent_____ | 42.7 | 77.9 |

[1] Limit of equipment.

These data from Table II show a very superior dry compression strength of the sample containing the glacio-lacustrine clay as compared with either the southern bentonite or western bentonite bonded systems, the dry compression strengths of the southern bentonite bonded system being especially low. The comparatively small loss of green compression strength illustrates the ruggedness of the glacio-lacustrine molding sand composition as compared with the southern bentonite bonded system, the loss in green compression strength being an accepted measure of the durability of the bonded system. On this basis, the glacio-lacustrine clay sand system compares very favorably with the western bentonite bonded sand. Examination of Tables II and III indicates that the substantially neutral glacio-lacustrine clay employed in the molding sand composition of the present invention cannot be classified as either a southern or western bentonite mineral, especially in view of the significant chemical differences as set forth earlier in the specification.

Thus, the addition of the glacio-lacustrine clay to the southern bentonite system as a stabilizer is productive of a stabilized bonded system having very substantially increased high dry strength and reduced green compression losses as contrasted with the southern bentonite bonded system alone. In addition, the glacio-lacustrine clay stabilizer improves the hot strength of the southern bentonite bonded system so that castings may be poured at higher temperatures. For example, the standard sand glacio-lacustrine mixture exhibits a hot strength at 2000 degrees Fahrenheit of approximately sixty pounds, whereas United States Patent 2,256,047 indicates that a comparable southern bentonite bonded system at 2000 degrees Fahrenheit shows a hot strength of only fifteen pounds or less. Thus, the addition of the substantially neutral glacio-lacustrine clay as a stabilizer to the southern bentonite bonded molding sand system improves markedly the dry compression strength and hot strength of the system, while at the same time, increasing the durability of the molding sand composition very significantly. Thus, the need for comparatively large amounts of organics and other additives is largely obviated by the incorporation of the substantially neutral glacio-lacustrine clay in the southern bentonite bonded molding sand system.

When the glacio-lacustrine clay of the present invention is used in conjunction with western bentonite in the molding sand system as shown in Table III, it stabilizes the high expansion and contraction of the western bentonite, while at the same time it improves very considerably the flowability qualities of the system so that the molding sand can be put through conveyor and chute apparatus. In contrast with the western bentonites which swell appreciably under aqueous conditions and expand readily at elevated temperatures, the glacio-lacustrine clay stabilizer of the present invention does not swell easily when subjected to water or moisture and does not expand significantly at temperatures of from 1500 to 2700 degrees Fahrenheit. Furthermore, higher collapsibility properties are imparted to the synthetic molding sand system so that the finished castings can be removed from the sand mold easily and without the necessity of employing vigorous "shake-out" and cleaning methods to free the casting from the sand mold. The use of the organics, particularly the cereal by-products and pulverized bituminous coal, which have heretofore been used to stabilize the western bentonite bonded molding sands is almost obviated in many instances by the present glacio-lacustrine clay stabilizer, which is quite non-swelling, particularly at elevated temperatures. For example, it is possible to eliminate completely the conventional cereal binder from the molding sand system and to reduce the amount of sea coal, which is almost universally employed in foundry practice, by as much as fifty percent. The western bentonite molding sand system stabilized with the glacio-lacustrine clay of the present invention is easily rammed or squeezed around a pattern in forming the sand mold, a quality not possessed by the western bentonite bonded sand alone. The enhanced characteristics of the western bentonite bonded system stabilized with the glacio-lacustrine clay are achieved without any accompanying deleterious effect on the green compression strength, as shown in Table III, while at the same time the dry compression strength is superior to that of the western bentonite bonded system alone, as seen from Tables II and III. The combined southern bentonite-western bentonite bonded system, as illustrated in Table III, is found to be quite deficient in dry compression properties, while the loss of green compression strength is exceedingly high by comparison with the western bentonite bonded system in which the glacio-lacustrine clay is utilized as a stabilizer. Thus, with the use of the novel glacio-lacustrine clay stabilizer, the western bentonite bonded silica sand system exhibits improved flowability and collapsibility properties, these being achieved despite the almost complete absence of the organics conventionally used to stabilize the expansion and contraction of the bentonite and to improve the flowability and collapsibility properties of the bonded system. As a result of the stabilizing action exerted by the glacio-lacustrine clay, the western bentonite bonded molding sand system can be successfully employed to produce castings within 0.002 of an inch of the pattern size, thus eliminating the need for extensive machining of the castings. Castings cannot be produced with this degree of accuracy with the usual western bentonite bonded systems due to the expansion and shrinkage of the mold which results in oversize and undersize defects in the casting.

The following examples illustrate the novel composition of the present invention but are not to be construed as limiting the scope of the invention.

*Example 1*

To a uniform layer of flat wetted burned heap sand was added substantially neutral glacio-lacustrine clay forming an even layer over the heap. Western bentonite, in a proportion of one part to two parts of glacio-lacustrine clay, was then spread over the glacio-lacustrine layer. The combined western bentonite and glacio-lacustrine clay comprised about twenty percent by weight of the finished molding sand composition. The green compression strength of the final molding composition was about eight to ten pounds per square inch, as determined by the procedure recommended by the American Foundrymen's Association. This molding composition was suitable for grey iron and malleable facings.

*Example 2*

Sixteen hundred pounds of sharp silica sand, containing about 4.5 percent moisture, was mixed in a vertically suspended rotary agitator with 200 pounds of western bentonite and 200 pounds of substantially neutral glacio-lacustrine clay until a thoroughly homogeneous molding sand mixture was obtained.

*Example 3*

To 880 pounds of burned heap sand was added fifty pounds of substantially neutral glacio-lacustrine clay forming a continuous layer over the heap of sand. Twenty pounds of pulverized bituminous coal (sea coal) was added to fifty pounds of western bentonite and the resulting admixture spread over the glacio-lacustrine clay layer. A cutting machine was employed to disperse the contents of the heap, forming a windrow of western bentonite bonded molding sand having the glacio-lacustrine clay stabilizer. The resulting composition was rammed around a pattern to form a synthetic sand mold suitable for grey iron foundry practice.

Example 4

Sixteen hundred parts by weight of sand was admixed with 100 parts by weight of southern bentonite, 280 parts by weight of substantially neutral glacio-lacustrine clay and twenty pounds of organic cereal binder in a Muller machine. The moisture content was adjusted to about four percent, the resulting molding sand composition being suitable as a brass facing formula.

Example 5

According to the procedure of Example 2, nine hundred pounds of burned sand was admixed with thirty pounds of non-swelling montmorillonite mineral (southern bentonite) and seventy pounds of substantially neutral glacio-lacustrine clay until a thoroughly dispersed molding sand mixture, containing about 3.5 percent moisture, was obtained.

In forming the novel molding composition of the present invention, varying amounts of glacio-lacustrine clay stabilizer may be employed. For example, from about two to thirty parts by weight of combined bonding agent and glacio-lacustrine clay can be utilized satisfactorily with from ninety to seventy parts by weight of sand, the ratio of the glacio-lacustrine clay to western bentonite being about two to one preferably. However, ratios of glacio-lacustrine clay to bentonite of between about one-half and four or more to one provides a satisfactory mixture which, when added to the silica sand, provides a very superior foundry molding composition. Any of the common sands customarily employed in foundry practice may be utilized in the practice of the present invention. For example, lake or bank sands, various silica sands and burnt sand materials are entirely satisfactory. The preferred binding or bonding agents employed in the composition of the present invention are the western or southern bentonites, since the glacio-lacustrine clay is peculiarly suitable from the point of view of complementing these bentonites, to form molding compositions characterized by very high dry compression strength, high flowability and high collapsibility. The fire-clays are likewise operative as bonding agents together with the glacio-lacustrine clay stabilizer.

If desired, other bonding agents, notably refractory clays, kaolinites, and certain diatomaceous materials may be employed as bonding agents in the novel composition of the present invention, although, generally, the bentonites are the preferred bonding agent embodiment. If desired, organics such as cereal by-products, wood flour, pulverized bituminous coal and other organic matter may be incorporated in the molding sand composition of the present invention, the precise choice of organic and the amount being dependent upon the ultimate use, e. g., in grey iron, non-ferrous, malleable and steel foundry practice, although in general, only very minor amounts are employed in view of the excellent stabilizing influence exerted by the glacio-lacustrine clay to the fire-clay, western bentonite or southern bentonite bonded molding sand system.

It is to be understood that the invention is not to be limited to the exact details of operation or exact compositions shown and described as obvious modifications and equivalents will be apparent to one skilled in the art, and the invention is therefore to be limited only by the scope of the appended claims.

I claim:

1. A molding composition having high dry compression strength, high flowability and high collapsibility consisting essentially of (a) sand, (b) a clay bonding agent and (c) a glacio-lacustrine clay comprising substantially about 41.5 percent $SiO_2$, 12.6 percent $Al_2O_3$, 14.2 percent CaO, 6.1 percent MgO, and 5.3 percent $Fe_2O_3$, when calculated on the basis of the oxide form, and about 18.1 percent volatile matter, the ratio of (c) to (b) by weight being between about one-half and about four to about one.

2. A molding composition having high dry compression strength, high flowability and high callapsibility consisting essentially of (a) sand, (b) a bonding agent selected from the group consisting of western bentonite, southern bentonite and fire clays, and (c) a glacio-lacustrine clay as a stabilizer comprising substantially about 41.5 percent $SiO_2$, 12.6 percent $Al_2O_3$, 14.2 percent CaO, 6.1 percent MgO, and 5.3 percent $Fe_2O_3$, when calculated on the basis of the oxide form, and about 18.1 percent volatile matter, the ratio of (c) to (b) by weight being between about one-half and about four to about one.

3. The composition of claim 2 wherein the ratio of (c) to (b) is about two to one by weight.

4. A molding composition having dry compression strength, high flowability and high collapsibility consisting essentially of (a) sand (b) western bentonite and (c) a glacio-lacustrine clay, comprising substantially about 41.5 percent $SiO_2$, 12.6 percent $Al_2O_3$, 14.2 percent CaO, 6.1 percent MgO, and 5.3 percent $Fe_2O_3$, when calculated on the basis of the oxide form, and about 18.1 percent volatile matter, as a stabilizer, the ratio of (c) to (b) by weight being between about one-half and about four to about one.

5. The composition of claim 4 wherein the ratio of (c) to (b) is about two to one by weight.

6. A molding composition having high dry compression strength, high flowability and high collapsibility consisting essentially of (a) sand (b) southern bentonite and (c) a glacio-lacustrine clay, comprising substantially about 41.5 percent $SiO_2$, 12.6 percent $Al_2O_3$, 14.2 percent CaO, 6.1 percent MgO, and 5.3 percent $Fe_2O_3$, when calculated on the basis of the oxide form, and about 18.1 percent ignition loss, as a stabilizer, the ratio of (c) to (b) by weight being between about one-half and about four to about one.

References Cited in the file of this patent

UNITED STATES PATENTS

| Number | Name | Date |
|---|---|---|
| 1,657,573 | Hanley | Jan. 31, 1928 |
| 2,230,939 | Dunbeck | Feb. 4, 1941 |
| 2,504,133 | Kerlin | Apr. 18, 1950 |